United States Patent
Lim et al.

(10) Patent No.: US 8,315,434 B2
(45) Date of Patent: Nov. 20, 2012

(54) ABSOLUTE TRACKING IN A SUB-PIXEL RANGE

(75) Inventors: Teng Hun Lim, Gelugor (MY); Meng Whui Tan, Sungai Ara (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 990 days.

(21) Appl. No.: 12/349,052

(22) Filed: Jan. 6, 2009

(65) Prior Publication Data

US 2010/0172545 A1 Jul. 8, 2010

(51) Int. Cl.
*G06K 9/00* (2006.01)

(52) U.S. Cl. ....................................................... 382/106

(58) Field of Classification Search .................. 382/106; 345/166; 250/208.1
See application file for complete search history.

(56) References Cited

U.S. PATENT DOCUMENTS

| | | | |
|---|---|---|---|
| 5,786,804 A * | 7/1998 | Gordon | 345/158 |
| 6,433,780 B1 | 8/2002 | Gordon et al. | |
| 2002/0105656 A1 * | 8/2002 | Nahum et al. | 356/614 |
| 2003/0194009 A1 * | 10/2003 | Srinivasan | 375/240.16 |
| 2004/0012794 A1 * | 1/2004 | Nahum et al. | 356/620 |
| 2004/0252759 A1 * | 12/2004 | John Winder et al. | 375/240.12 |
| 2006/0209015 A1 * | 9/2006 | Feldmeier et al. | 345/156 |
| 2008/0288205 A1 * | 11/2008 | Teoh et al. | 702/150 |

* cited by examiner

*Primary Examiner* — Vu Le
*Assistant Examiner* — Amara Abdi (57) ABSTRACT

An optical navigation device for absolute tracking in a sub-pixel range. The optical navigation device includes an image sensor and a tracking engine. The image sensor includes a pixel array to generate a plurality of tracking images. The tracking images correspond to incident light at the pixel array. The tracking engine determines a sub-pixel displacement value of a tracking surface based on a comparison of at least two of the tracking images. The tracking engine includes a sub-pixel approximation engine and a linear approximation engine. The sub-pixel approximation engine generates an intermediate sub-pixel displacement value based on a sub-pixel approximation according to a non-linear sub-pixel distribution. The linear approximation engine generates a final sub-pixel displacement value from the intermediate sub-pixel displacement value.

20 Claims, 6 Drawing Sheets

ABSOLUTE TRACKING IN A SUB-PIXEL RANGE

BACKGROUND

An optical navigation device generally uses image correlation techniques to determine movement of the optical navigation device relative to an imaged reference. Features within each image are correlated to one another in sequential images in order to determine the direction of movement of the device relative to the imaged (e.g., a surface or scene).

In conventional correlation techniques, there are three parameters that can be used to determine the effectiveness of the navigation tracking techniques. These parameters are speed, resolution, and accuracy. The speed of the correlation process depends primarily on the size of the navigation array that needs to be processed. The navigation array is the set of picture elements (i.e., pixels) that need to be processed and compared with the pixels of the reference image. The pixels of the reference image are referred to as the base array. Resolution refers to the amount of detail that is discernable with the image. The resolution of an image depends on the pixel density, or the size of each pixel and how many pixels are used to image a given area. In general, the speed of the correlation process is reduced in relation to an increase in the resolution. The accuracy of the correlation technique depends on the type of correlation algorithms that are used. In general, more accurate correlation algorithms can decrease the speed of the correlation process.

Within conventional correlation techniques, referencing refers to how two images are correlated. In general, there are two types of referencing: relative referencing and absolute referencing. Relative referencing refers to determining individual movements from one image to the next sequential image. With each new image, the reference image is updated so that the new image is compared with the immediately preceding image as the reference image. Absolute referencing refers to determining movements from each image relative to a fixed image. So each new image is compared with the same reference image, without updating the reference image each time.

Re-referencing is one source of errors in conventional correlation techniques. Re-referencing refers to obtaining a new reference image, or base array, when the navigation array approaches a boundary condition. In order to maintain some correlation between each new image and the reference image, a new base array is chosen as the reference image when the device anticipates that the navigation array will image a surface or scene outside of the previous base array. This selection of a new base array is referred to as re-referencing. However, each time re-referencing occurs, an error factor can accumulate and cause the calculated movement to be slightly incorrect. As more re-referencing occurs, the cumulative error can exceed acceptable limits.

Some conventional correlation techniques use sub-pixel approximation in order to artificially increase the resolution and, hence, accuracy of the correlation process. Sub-pixel approximation generally refers to approximating movements that are less than one pixel in magnitude. Sub-pixel approximation is used in applications such as printing devices that benefit from relatively high movement sensitivity. However, sub-pixel approximation techniques can increase the amount of error in the correlation process.

3-point peak (3PP) approximation is one type of sub-pixel approximation that is used in applications to increase movement sensitivity to determine displacement movements that are a fraction of a pixel dimension. In applications which rely on relative referencing, 3PP approximation can be accurate and useful because cumulate movement data, and the associated cumulative error, are not used. However, 3PP approximation is not suitable for absolute referencing because the cumulative error quickly exceeds acceptable limits based on the tendency of 3PP approximation to skew approximation values in a non-linear manner.

SUMMARY

Embodiments of an apparatus are described. In one embodiment, the apparatus is an optical navigation device. The optical navigation device includes an image sensor and a tracking engine. The image sensor includes a pixel array to generate a plurality of tracking images. The tracking images correspond to incident light at the pixel array. The tracking engine determines a sub-pixel displacement value of a tracking surface based on a comparison of at least two of the tracking images. The tracking engine includes a sub-pixel approximation engine and a linear approximation engine. The sub-pixel approximation engine generates an intermediate sub-pixel displacement value based on a sub-pixel approximation according to a non-linear sub-pixel distribution. The linear approximation engine generates a final sub-pixel displacement value from the intermediate sub-pixel displacement value. In one embodiment, the linear approximation engine generates the final sub-pixel displacement value according to a compensation distribution to compensate for the non-linear sub-pixel distribution used by the sub-pixel approximation engine. Other embodiments of the apparatus are also described.

Embodiments of a method are also described. In one embodiment, the method is a method for sub-pixel tracking with an optical navigation device. In one embodiment, the method includes generating a plurality of images of a tracking surface based on light detected at an image sensor. The method also includes comparing at least two of the images to determine a sub-pixel displacement value of the tracking surface. In one embodiment, determining the sub-pixel displacement value of the tracking surface includes approximating an intermediate sub-pixel displacement value based on a sub-pixel approximation according to a non-linear sub-pixel distribution. Determining the sub-pixel displacement value also includes generating a final sub-pixel displacement value from the intermediate sub-pixel displacement value according to a compensation distribution to compensate for the non-linear sub-pixel distribution. Other embodiments of the method are also described.

Embodiments of a computer program product are also described. In one embodiment, the computer program product includes a computer readable storage medium embodying a program of machine-readable instructions, executable by a digital processor, to perform operations to facilitate absolute tracking in a sub-pixel range. The operations include an operation to compare two images of a tracking surface. The operations also include one or more operations to approximate an intermediate sub-pixel displacement value of a correlation between the two images of the tracking surface. The intermediate sub-pixel displacement value is based on a non-linear sub-pixel distribution. The operations also include one or more operations to generate a final sub-pixel displacement value from the intermediate sub-pixel displacement value according to a compensation distribution to compensate for the non-linear sub-pixel distribution. A combination of the intermediate sub-pixel distribution and the compensation distribution produces a substantially linear distribution. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

While many embodiments are described herein, at least some of the described embodiments relate to an optical navigation device capable of absolute tracking in a sub-pixel range. Embodiments of the optical navigation device reduce tracking errors due to non-linear sub-pixel approximations. In particular, the optical navigation device may reduce the cumulative error that is caused by re-referencing in conventional systems. Embodiments of the optical navigation device also increase the accuracy of the optical navigation system.

Figure 1:
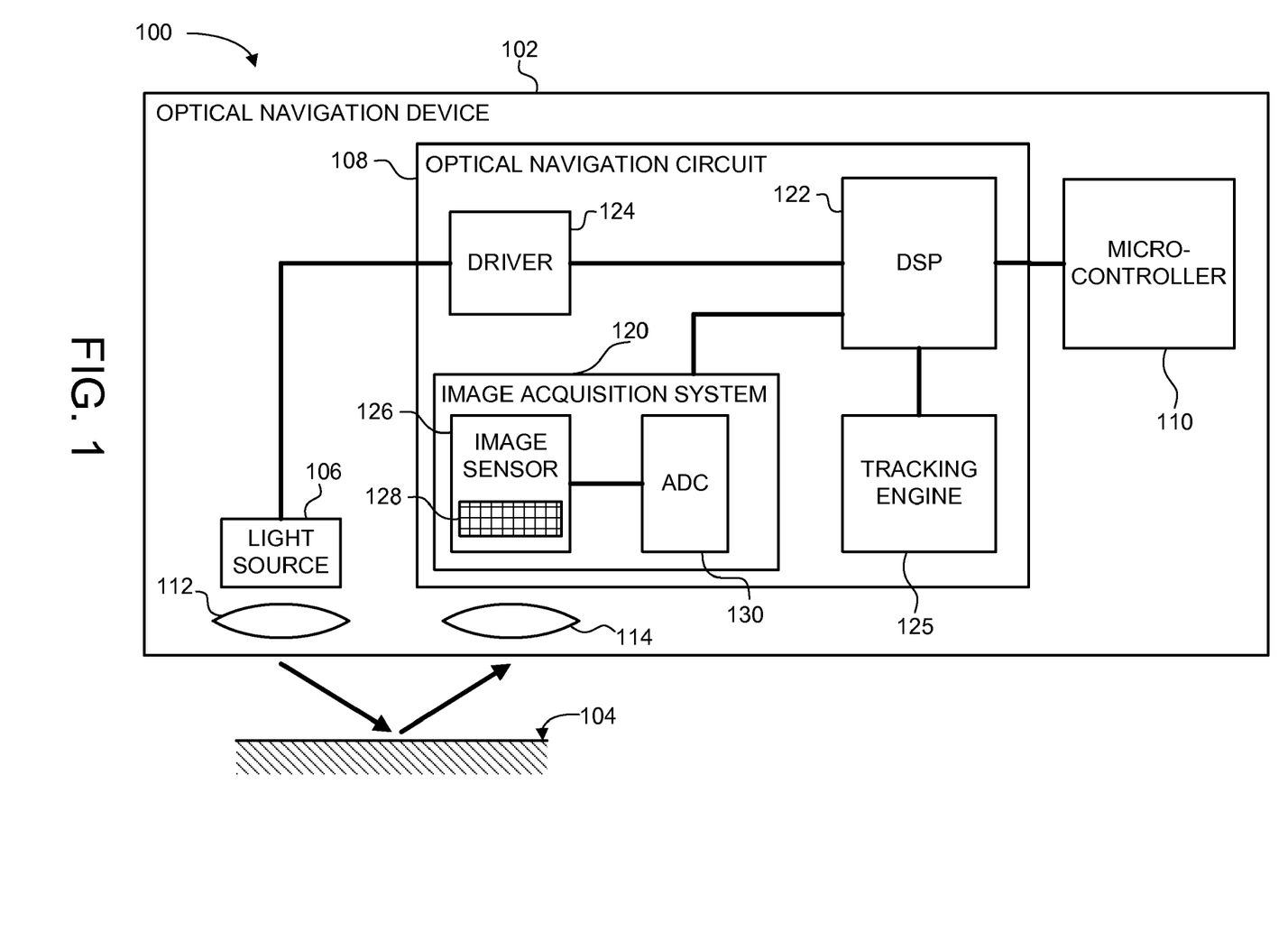
FIG. 1 depicts a schematic diagram of one embodiment of an optical navigation system.

FIG. 1 depicts a schematic diagram of one embodiment of an optical navigation system 100. The illustrated optical navigation system 100 includes an optical navigation device 102 relative to a navigation surface 104. In general, the optical navigation device 102 illuminates portions of the navigation surface 104 in order to generate images of the illuminated portions or features at the navigation surface 104. More specifically, the optical navigation device 120 moves relative to the navigation surface 104, or vice versa, and generates one or more navigation signals representative of the movement of the optical navigation device 102 relative to the navigation surface 104. Hence, the navigation surface 104 also may be referred to as a navigation surface. Additionally, since the navigation surface 104 is used to track the movement of the optical navigation device 102, the navigation surface 102 also may be referred to as a tracking surface.

In another embodiment, the optical navigation device 102 is used to track the movement of the navigation surface 104. More specifically, the optical navigation device 102 may be in a fixed position relative to the navigation surface 104 of an object (not shown) which is moving. For example, the optical navigation device 102 may track the movement of a paper or other printing medium within a printer device (refer to FIG. 6 and the accompanying description below). Thus, embodiments of the optical navigation device 102 are able to track relative movements between the optical navigation device 102 itself and a navigation surface 104, regardless of whether the optical navigation device 102 or the navigation surface 104 is subject to the movement. For convenience, references to movements of the optical navigation device 102 are understood to include all relative movements between the optical navigation device 102 and the navigation surface 104, including movements of the navigation surface 104.

In order to illuminate the navigation surface 104, the optical navigation device 102 emits a light beam which is at least partially reflected by the navigation surface 104. The optical navigation device 102 detects the reflected light beam and processes the reflected light beam to generate the navigation signals. Examples of how the navigation signals may be generated are described in more detail below.

The navigation surface 104 may be any type of surface and may include one or more types of material compositions. Examples of typical navigation surfaces 104 include wood, stone, or plastic laminate desktops, as well as fabric or other textured navigation pads (e.g., a mouse pad). Other examples of navigation surfaces 104 include paper and other printing media. Other examples of navigation surfaces 104 include floors of all varieties, as well as the ground. Other examples of navigation surfaces 104 include tires and other moving parts of vehicles which may be indicative of speed, direction, or other movements of the vehicles. Other embodiments may include other types of navigation surfaces and/or objects.

The distance between the optical navigation device 102 and the navigation surface 104 may vary depending on the application for which the optical navigation device 102 is used. In surface navigation applications, the optical navigation device 102 may be relatively close to the navigation surface 104. For example, a housing of the optical navigation device 102 may be in direct, physical contact with the navigation surface 104. Alternatively, stand-off structures (not shown) attached to the housing of the optical navigation device 102 may be in direct, physical contact with the navigation surface 104. In other embodiments, the optical navigation device 102 may be within a few centimeters or inches of the navigation surface 104, without being in direct, physical contact with the navigation surface 104. In contrast, in free space navigation applications, the optical navigation device 102 may be relatively far from the navigation surface 104. For example, the optical navigation device 102 may operate outside of the surface navigation optical range.

The depicted optical navigation device 102 includes a light source 106 and a microcontroller 110. In one embodiment, the light source 106 is a light emitting diode (LED). In another embodiment, the light source 106 is a laser. For example, the light source 106 may be a vertical cavity surface emitting laser (VCSEL). Alternatively, the light source 106 may be another type of laser or other light source.

The depicted optical navigation circuit 108 includes an image acquisition system (IAS) 120, a digital signal processor (DSP) 122, a driver 124, and a tracking engine 125. In one embodiment, the driver 124 of the optical navigation circuit 108 controls the operation of the light source 106 (e.g., using a driver signal) to generate the light beam that is emitted toward the navigation surface 104. As described above, the reflected light beam, or a portion thereof, is then received by the image acquisition system 120.

The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As examples, the image sensor 126 may include a 16×16, 30×30, 50×50, or 128×96 (VGA) array of distinct photodetectors configured to detect light that is reflected from the illumination surface 104. In one embodiment, the navigation sensor 126 generates a plurality of electrical signals corresponding to light intensity of the reflected light at the pixel array 128. Each of the electrical signals corresponds to one of the picture elements (or pixels) of the pixel array 128. At least a portion of the light beam reflected from the navigation surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the navigation surface 104. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

The tracking engine 125 coupled to the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., $\Delta x$ and $\Delta y$). The movement vectors are then used to determine the movement of the optical mouse relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein. Although many of these examples are provided within the context of user input devices (e.g., optical mice), similar concepts, structures, and functionality may be implemented in more sophisticated optical navigation and tracking devices.

The analog-to-digital converter (ADC) 130 converts the plurality of electrical signals, received from the pixel array 128 of the navigation sensor 126, from analog signals to digital signals (e.g., 8-bit digital values). The analog-to-digital converter 130 then passes the digital signals to the digital signal processor 122.

After the digital signal processor 122 receives the digital form of the electrical signals from the analog-to-digital converter 130 of the image acquisition system 120, the digital signal processor 122 may perform additional processing using the digital signals. In some embodiments, the digital signal processor 122 implements certain functionality by accessing information stored on a memory device (refer to FIG. 2). In general, the memory stores instructions, code, programs, functions, algorithms, and other data, in various formats, to provide functionality to the digital signal processor 122. One example of the memory is shown within the tracking engine 125 of FIG. 2, which is described in more detail below.

The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation device 102 relative to the navigation surface 104, or vice versa. Alternatively, the quadrature or other signals may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 2:
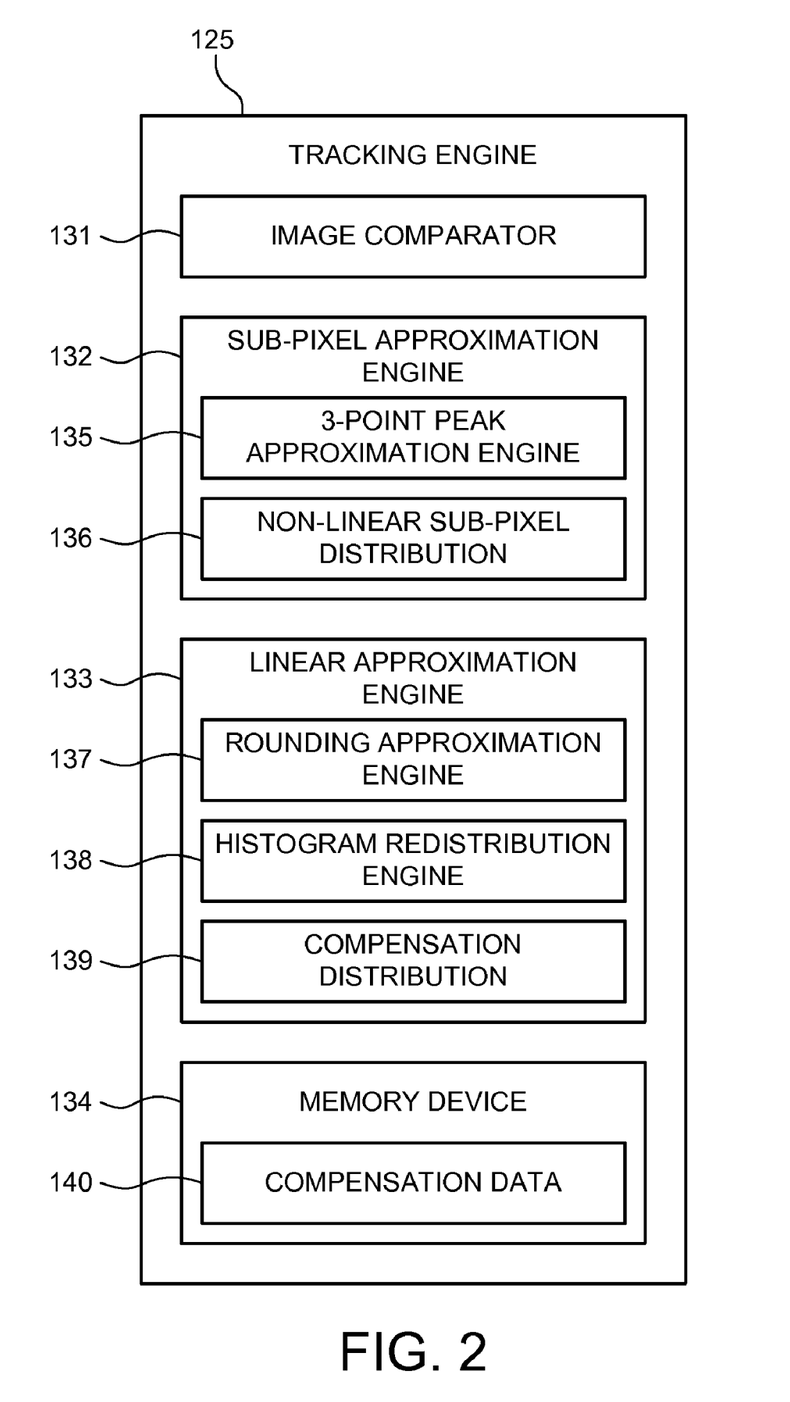
FIG. 2 depicts a schematic block diagram of one embodiment of the tracking engine of the optical navigation device of FIG. 1.

FIG. 2 depicts a schematic block diagram of one embodiment of the tracking engine 125 of the optical navigation device 102 of FIG. 1. In general, the tracking engine 125 determines sub-pixel displacement values of the navigation surface 104 based on a comparison of at least two tracking images. The illustrated tracking engine 125 includes an image comparator 131, a sub-pixel approximation engine 132, a linear approximation engine 133, and a memory device 134. The sub-pixel approximation engine 132 includes a 3-point peak approximation engine 135 and a non-linear sub-pixel distribution 136. The linear approximation engine 133 includes a rounding approximation engine 137, a histogram redistribution engine 138, and a compensation distribution 139. The memory device 134 includes compensation data 140. Other embodiments of the tracking engine 125 may include fewer or more components to implement less or more functionality.

In one embodiment, the image comparator 131 compares two or more images to each other in order to determine a relative movement between the images. In particular, the image comparator 131 identifies pixel sequences within each image and determines relative pixel movements between the images based on the positions of the identified pixel sequences in each image. Various methods for identifying pixel sequences and comparing images are known and, hence, are not described in more detail herein.

Figure 4A:
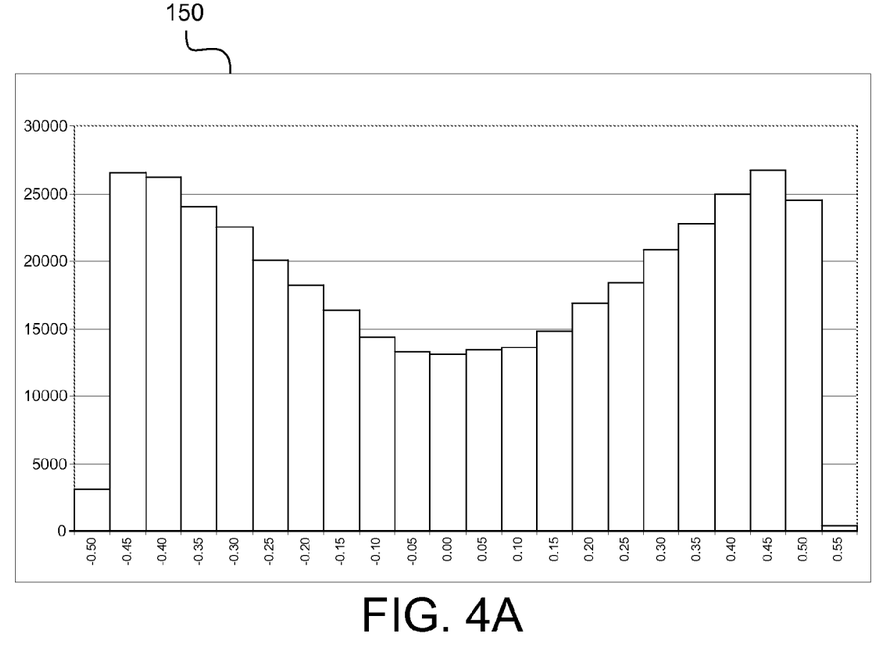
FIG. 4A depicts a histogram of one embodiment of a dataset of sub-pixel approximations based on a 3-point peak approximation technique.

In one embodiment, the sub-pixel approximation engine 132 generates an intermediate sub-pixel displacement value based on a sub-pixel approximation. The sub-pixel approximation relies on a non-linear sub-pixel distribution, which means that the sub-pixel approximation tends to approximate sub-pixel movements unevenly across the sub-pixel range. For example, the 3-point peak approximation engine, which implements a specific sub-pixel approximation technique, tends to approximate sub-pixel movements more toward the far ends of the sub-pixel range. So, if the sub-pixel range spans from −0.5 pixels to +0.5 pixels (one half of a pixel in each direction), then the 3-point peak approximation engine approximates more movements towards the −0.5 and +0.5 extremes and less movements near the −0.1 to +0.1 range. FIG. 4A depicts a histogram 150 of one embodiment of a dataset of sub-pixel approximations based on a 3-point peak approximation technique. In one embodiment, the sub-pixel approximation engine 132 stores a non-linear sub-pixel distribution 136 similar to the dataset of FIG. 4A. Some embodiments of the sub-pixel approximation engine 132 may use the 3-point peak approximation engine 135 to implement a 3-point peak approximation algorithm or another type of non-linear sub-pixel approximation algorithm, while other embodiments may use the non-linear sub-pixel distribution 136 to perform the sub-pixel approximation.

Figure 4B:
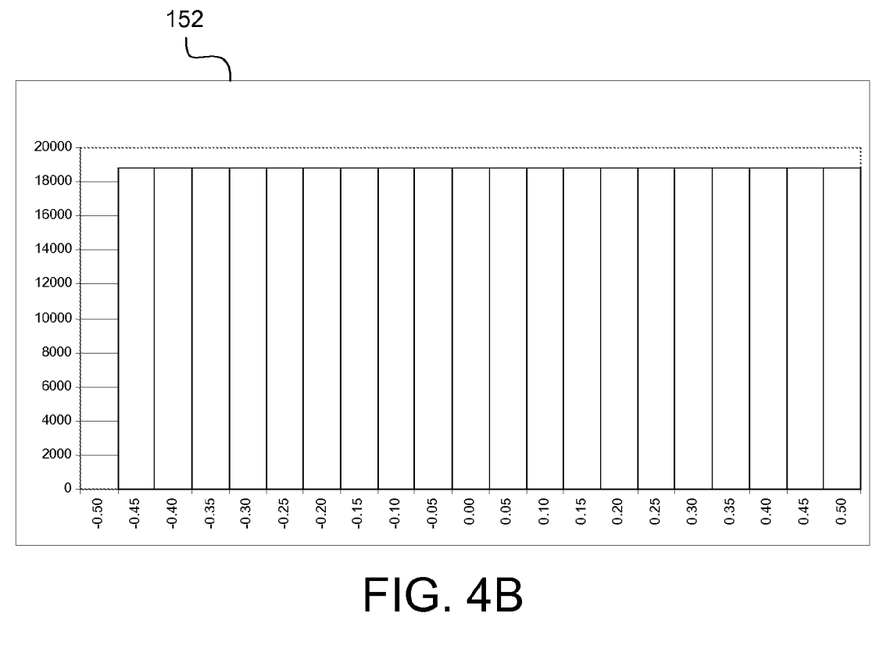
FIG. 4B depicts a histogram of one embodiment of a dataset of sub-pixel approximations after rounding and redistribution of the intermediate sub-pixel approximation to achieve a sub-pixel approximation according to a substantially linear distribution.

The linear approximation engine 133 uses the intermediate sub-pixel displacement value generated by the sub-pixel approximation engine 132 and generates a final sub-pixel displacement value based on the intermediate sub-pixel displacement value. In particular, the rounding approximation engine 137 rounds the intermediate sub-pixel displacement value to a rounded sub-pixel displacement value with a specific number of significant digits. Then, the histogram redistribution engine 138 assigns the rounded sub-pixel displacement value to one of several histogram bins. The histogram bins have bin values that compensate for the non-linear sub-pixel distribution 136 used by the sub-pixel approximation engine 132. FIG. 4B depicts a histogram 152 of one embodiment of a dataset of sub-pixel approximations after rounding and redistribution of the intermediate sub-pixel approximation to achieve a sub-pixel approximation according to a substantially linear distribution.

In essence, the histogram redistribution engine 138 redistributes bin values from the non-linear sub-pixel distribution to new bin values that correspond to a substantially linear sub-pixel distribution. Table 1 shows one example of how sub-pixel approximations from a non-linear sub-pixel distribution might be reassigned to new bin values to produce a substantially linear sub-pixel distribution.

TABLE 1

Sub-pixel redistribution values

| Bin Number | Bin Values for Non-Linear Distribution | Bin Values for Linear Distribution |
|---|---|---|
| 1 | −0.50 ≦ x < −0.45 | −0.50 ≦ x < −0.47 |
| 2 | −0.45 ≦ x < −0.40 | −0.47 ≦ x < −0.44 |
| 3 | −0.40 ≦ x < −0.35 | −0.44 ≦ x < −0.41 |
| 4 | −0.35 ≦ x < −0.30 | −0.41 ≦ x < −0.37 |
| 5 | −0.30 ≦ x < −0.25 | −0.37 ≦ x < −0.32 |
| 6 | −0.25 ≦ x < −0.20 | −0.32 ≦ x < −0.27 |
| 7 | −0.20 ≦ x < −0.15 | −0.27 ≦ x < −0.21 |
| 8 | −0.15 ≦ x < −0.10 | −0.21 ≦ x < −0.15 |
| 9 | −0.10 ≦ x < −0.05 | −0.15 ≦ x < −0.08 |
| 10 | −0.05 ≦ x < 0.0 | −0.08 ≦ x < 0.0 |
| 11 | 0.0 ≦ x < 0.05 | 0.0 ≦ x < 0.07 |
| 12 | 0.05 ≦ x < 0.10 | 0.07 ≦ x < 0.14 |
| 13 | 0.10 ≦ x < 0.15 | 0.14 ≦ x < 0.20 |
| 14 | 0.15 ≦ x < 0.20 | 0.20 ≦ x < 0.26 |
| 15 | 0.20 ≦ x < 0.25 | 0.26 ≦ x < 0.31 |
| 16 | 0.25 ≦ x < 0.30 | 0.31 ≦ x < 0.36 |
| 17 | 0.30 ≦ x < 0.35 | 0.36 ≦ x < 0.40 |
| 18 | 0.35 ≦ x < 0.40 | 0.40 ≦ x < 0.44 |
| 19 | 0.40 ≦ x < 0.45 | 0.44 ≦ x < 0.47 |
| 20 | 0.45 ≦ x ≦ 0.50 | 0.47 ≦ x ≦ 0.50 |

From the example redistribution numbers shown in Table 1, it can be understood that less approximations are assigned to the outward bins, and more approximations are assigned to the inside bins. For example, all of the sub-pixel approximation values between about 0.0 and 0.7 are assigned to bin 11, compared with only assigning the sub-pixel approximation values between about 0.0 and 0.5. So the histogram redistribution engine 138 distributes more sub-pixel approximation values to bin 11. Also, only the sub-pixel values between about 0.47 and 0.50 are assigned to bin 20, compared with assigning the sub-pixel approximation values between about 0.45 and 0.50. So the histogram redistribution engine 138 distributes less sub-pixel approximation values to bin 20. This redistribution helps to equalize the approximations across the entire range of sub-pixel approximations so that the resulting sub-pixel approximations are more linearly distributed. In this manner, the rounding and redistribution compensate for the non-linear sub-pixel distribution that is used by or results from the sub-pixel approximation engine 132. This results in a final sub-pixel displacement value that corresponds to a substantially linear approximation distribution. In some embodiments, the linear approximation engine 133 stores a specific compensation distribution dataset for use in the process of rounding and redistributing the approximation values generated by the sub-pixel approximation engine 132.

Additionally, the memory device 134 of the tracking engine 125 may store compensation data such as the non-linear sub-pixel distribution 136 and/or the compensation distribution 139. In some embodiments, the memory device also may store one or more algorithms, for example, to implement functionality for the image comparison, the 3-peak point approximation, the rounding, and the histogram redistribution.

It should also be noted that at least some of the functionality of the rounding approximation engine 137 and the histogram redistribution engine 138 may be based on data that is obtained prior to operation of the optical navigation device 102. More specifically, the rounding approximation engine 137 and the histogram redistribution engine 138 may use data that is obtained during a configuration or calibration stage.

Figure 3:
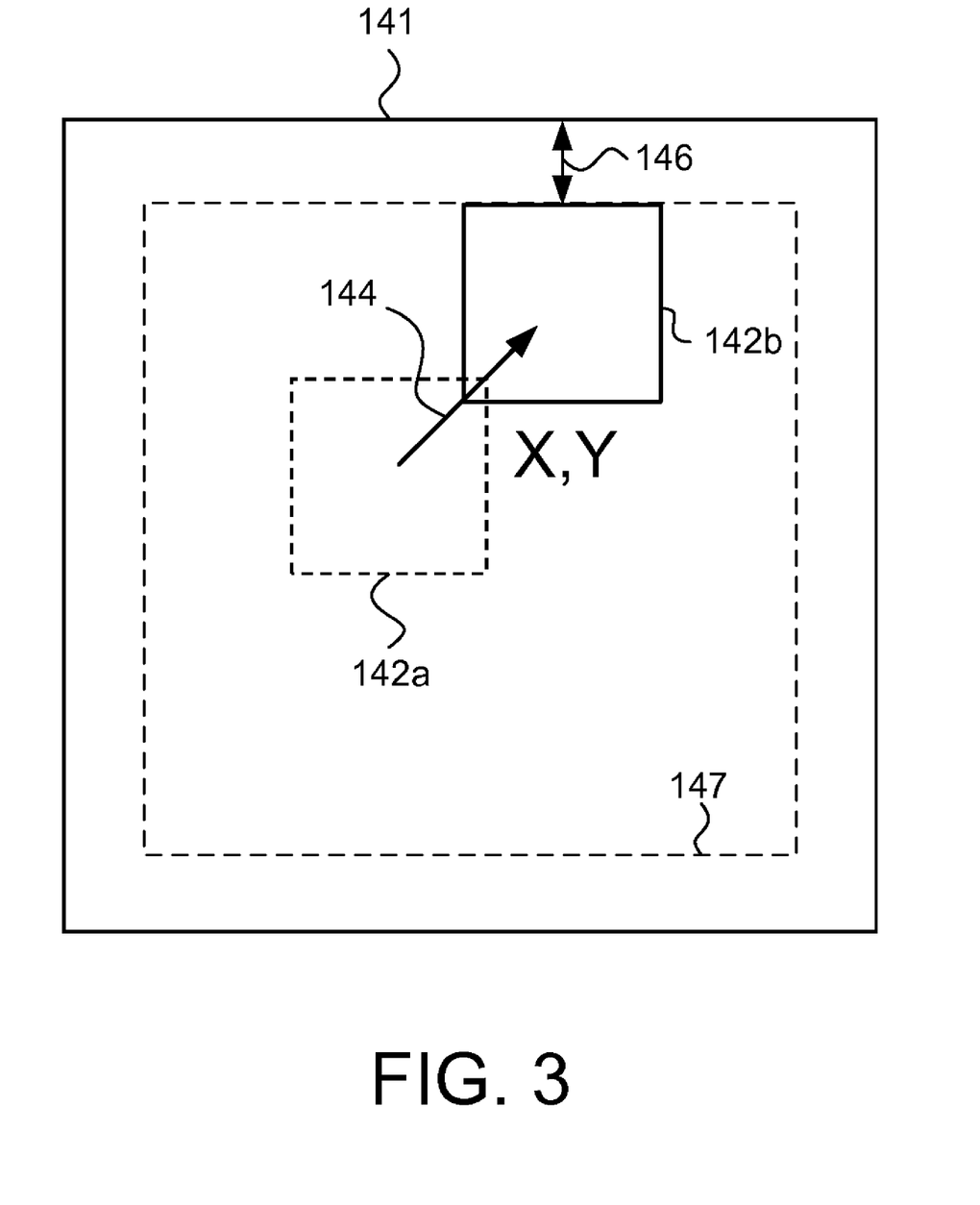
FIG. 3 depicts a diagram of one embodiment of a correlation between two images of the navigation surface.

FIG. 3 depicts a diagram of one embodiment of a correlation between two images of the navigation surface 104. The illustrated correlation depicts a base window 141, a first navigation window position 142a, a second navigation window position 142b, a navigation window displacement 144, a re-referencing distance 146, and a re-referencing threshold 147.

For reference, the base window 141 corresponds to pixel values that are imaged each time the image sensor 126 obtains an image of the navigation surface 104. In some embodiments, the base window 141 corresponds to a pixel array of 128×96 pixels. Other embodiments of the base window 141 may have other pixel array dimensions.

The navigation window corresponds to a set of pixels from a reference image of a base window. As one example, the size of the navigation window which includes the corresponding pixels is 50×50, although some embodiments may use other sizes of navigation windows. In some embodiments, the navigation window is less than about 25% of an area of the pixel array, although the navigation window may be more or less than about 25% of the area of the pixel array. Additionally, the navigation window may be arranged in a shape other than a square. The navigation window may move positions from one base window image to the next base window image, depending on where the corresponding pixels are located each time the image sensor 126 obtains a new base window 141.

The first navigation window position 142a refers to a section of the base window 141 which corresponds to certain pixel values. The second navigation window position 142b corresponds to the same or similar pixel values within a subsequent base window image. The second navigation window position 142b is found by comparison with the base window image which includes the first navigation window. The locations of the first and second navigation window positions 142a and 142b are compared to calculate the navigation window displacement 144. The navigation window displacement 144 describes the relative movement between the optical navigation device 102 and the navigation surface 104. In some embodiments, the navigation window displacement 144 includes X and Y components to describe the magnitude and direction of the change of location of the second navigation window position 142b relative to the first navigation window position 142a.

In some embodiments, the re-referencing distance 146 is used to identify the re-referencing threshold 147 around the edge of the base window 141. As long as the navigation window pixel values, or the surface features imaged within the navigation window, are within the re-referencing threshold 147 of the base window 141, the optical navigation device 102 continues to use the same navigation window. In other words, the optical navigation device 102 continues to track the movement of the surface features within the navigation window images until the features pass beyond the re-referencing threshold 147 and are within the re-referencing distance 146 from the edge of the base window 141. The optical navigation device 102 may identify a new navigation window within the current base window 141 in order to re-reference the navigation window. Other embodiments may re-reference based on other parameters.

FIG. 4A depicts a histogram 150 of one embodiment of a dataset of sub-pixel approximations based on a 3-point peak approximation technique. The illustrated histogram 150 includes approximately 300,000 sample data points, which illustrates that the 3-point peak approximation technique tends to assign sub-pixel approximation values in a non-linear manner. In particular, the data exhibits a non-linear trend as the values of the sub-pixel approximations skew towards the values of −0.5 and 0.5 at the left and right extremes of the histogram 150.

FIG. 4B depicts a histogram 152 of one embodiment of a dataset of sub-pixel approximations after rounding and redistribution of the intermediate sub-pixel approximation to achieve a sub-pixel approximation according to a substantially linear distribution. In the illustrated embodiment, the histogram 152 depicts the same data as the histogram 150 of FIG. 4A after the data has been modified by the rounding approximation engine 137 and the histogram redistribution engine 138. The linear trend in the modified data reduces the error in each displacement measurement between navigation windows because the smaller pixel displacement data points on the histogram 150 are corrected to be linear, rather than skewing toward the outer −0.5 and +0.5 values.

It should be noted that although the histogram 152 shows 20 separate bins, the number of bin divisions along the horizontal axis can be adjusted to determine the resolution of the sub-pixel approximation. For example, using 20 bin divisions yields a resolution accurate to about 5% of a pixel dimension.

Thus, each of the sub-pixel displacement measurements can be more accurate. Just as the error in each displacement measurement is reduced relative to conventional systems, the error in the data stored during the re-referencing stage is also reduced. Thus, the error accumulated over multiple re-referencing stages is reduced. This reduction in the cumulative error over several re-referencing cycles also lowers the rate at which the optical navigation device 102 re-references the navigation window. These and similar error reductions contribute to an overall improvement in the accuracy of the optical navigation device 102.

Figure 5:
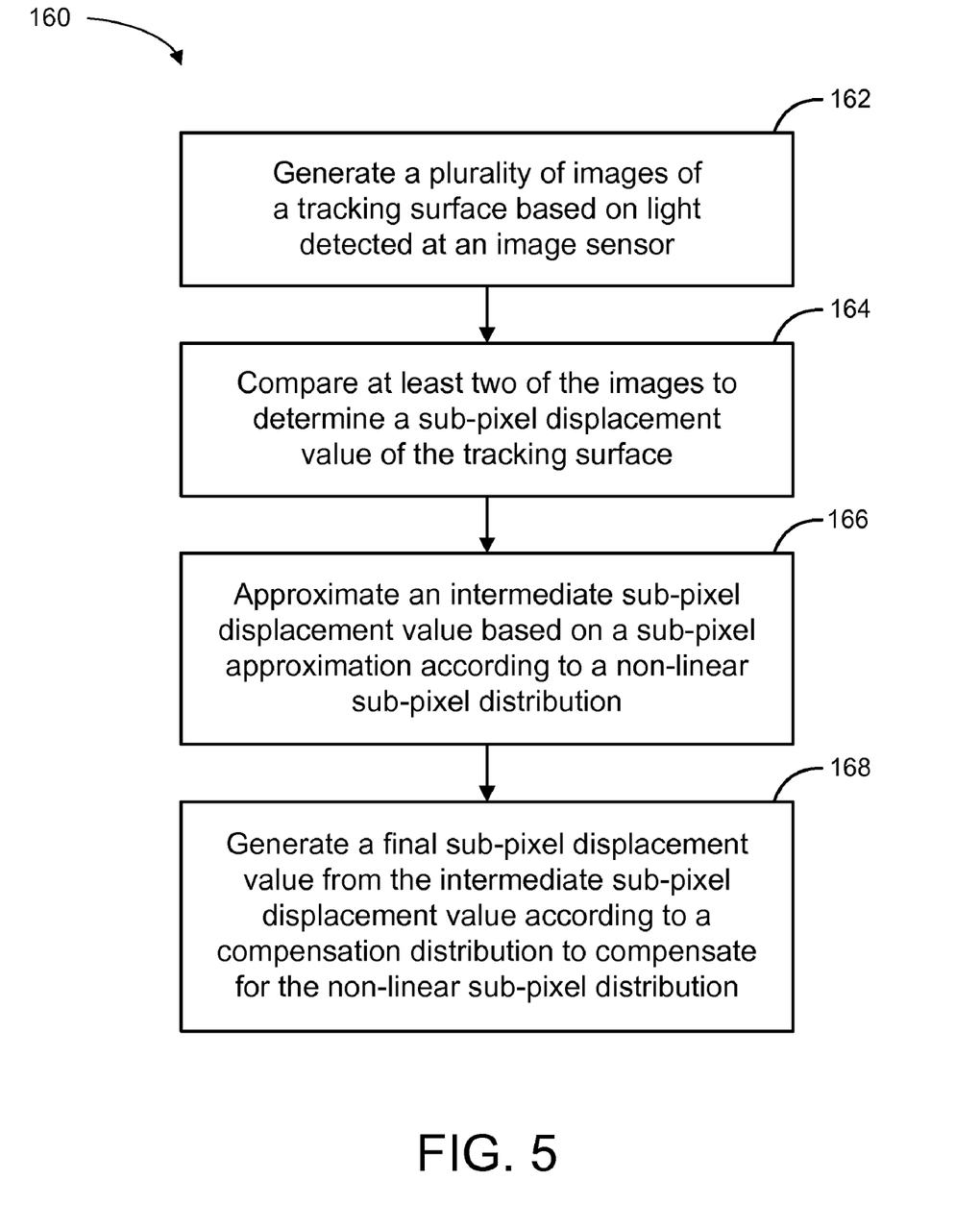
FIG. 5 depicts a block diagram of one embodiment of a method for sub-pixel tracking using an optical navigation device.

FIG. 5 depicts a block diagram of one embodiment of a method for sub-pixel tracking using an optical navigation device such as the optical navigation device 102 of FIG. 1. Although the method 160 is described in conjunction with the optical navigation device 102 of FIG. 1, embodiments of the method 160 may be implemented with other types of optical navigation input devices.

In the depicted method 160, at block 162 the image sensor 126 generates a plurality of images of a tracking surface 104 based on light detected at the image sensor 126. At block 164, the image comparator 131 compares at least two of the images to determine a sub-pixel displacement value of the tracking surface 104. Based on the comparison of the images at block 164, at block 166 the sub-pixel approximation engine 132 approximates an intermediate sub-pixel displacement value based on a sub-pixel approximation according to a non-linear sub-pixel distribution. In one embodiment, the sub-pixel approximation engine 132 uses the 3-point peak approximation engine 135 to generate the intermediate sub-pixel displacement value.

At block 168, the linear approximation engine 133 generates a final sub-pixel displacement value from the intermediate displacement value. As explained above, the linear approximation engine 133 generates the final sub-pixel displacement value according to a compensation distribution to compensate for the non-linear sub-pixel distribution. In one embodiment, the linear approximation engine 133 uses the rounding approximation engine 137 and the histogram redistribution engine 138 to generate the final sub-pixel displacement value. The depicted method 160 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Figure 6:
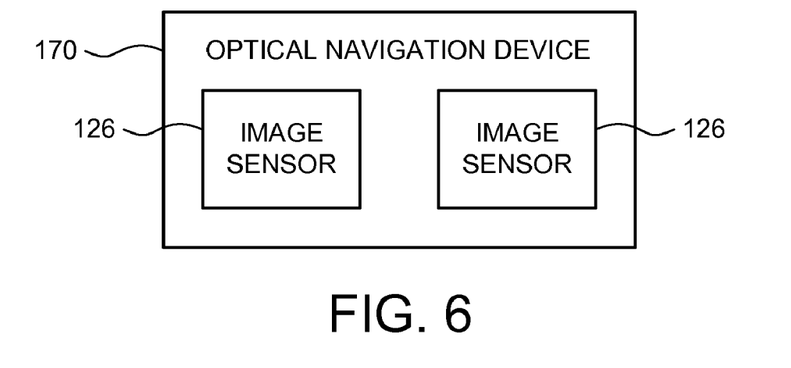
FIG. 6 depicts a schematic block diagram of another embodiment of an optical navigation device which includes two image sensors in order to track rotation.

FIG. 6 depicts a schematic block diagram of another embodiment of an optical navigation device 170 which includes two image sensors 126 in order to track rotation. While embodiments of the optical navigation device 102 of FIG. 1 are capable of tracking two-dimensional motion of the navigation surface 104, the optical navigation device 102 of FIG. 1 may be incapable of tracking rotation of the navigation surface 104. However, by including two image sensors 126 in the same optical navigation device 170 of FIG. 6, the optical navigation device 170 may perform rotational tracking in addition to two-dimensional tracking. Other embodiments may include more than two image sensors 126 and/or perform tracking in additional degrees of linear or rotational motion.

Figure 7:
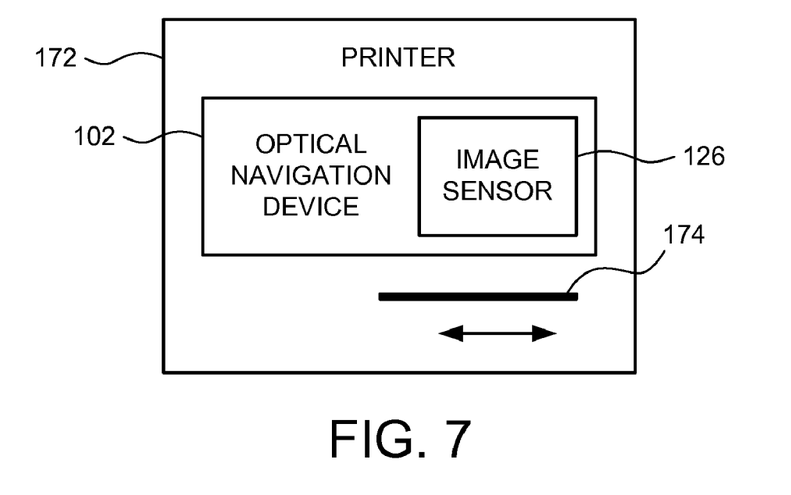
FIG. 7 depicts a schematic block diagram of one embodiment of a printer with an optical navigation device for tracking movements of a print medium.

FIG. 7 depicts a schematic block diagram of one embodiment of a printer 172 with an optical navigation device 102 for tracking movements of a print medium 174. As the print medium 174 (e.g., paper) moves past the image sensor 126 of the optical navigation device 102, the tracking engine (refer to FIG. 1) can accurately track the sub-pixel displacement of the print medium 174 during a printing operation.

Figure 8:
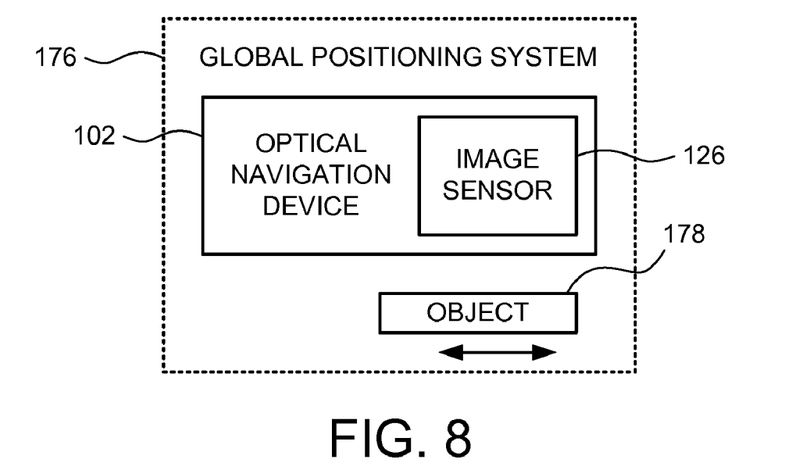
FIG. 8 depicts a schematic block diagram of one embodiment of a global positioning system with an optical navigation device for tracking movements of an object within a global positioning environment.

FIG. 8 depicts a schematic block diagram of one embodiment of a global positioning system (GPS) 176 with an optical navigation device 102 for tracking movements of an object 178 within a global positioning environment. In some embodiments, the optical navigation device 102 may be used to supplement GPS information or, alternatively, track a movement parameter when a GPS signal is not available. In other words, in the absence of GPS functionality, the optical navigation device 102 may track a movement parameter to track speed, direction, location, or another movement parameter of a person, vehicle, or other traveling object. The optical navigation device 102 may use surface navigation (i.e., nearfield navigation) or scene navigation (far-field navigation) to track the relative location of the object 178 and, hence, determine a relative movement of the optical navigation device 102 within the global positioning environment. For example, the optical navigation device 102 may track movements of an automobile relative to the ground by imaging the ground. In another example, the optical navigation device 102 may image a tire as it rotates. The movement of the ground or the tire may be correlated to indicate a speed or direction of travel of the vehicle. In another example, an optical navigation device 102 within an airplane may image the ground and determine direction, speed, or other movement parameter of the airplane. Such movement parameters may be used with or in place of GPS signals.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Embodiments of the invention can take the form of an embodiment containing both hardware and software elements. In one embodiment, the invention is at least partially implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations to facilitate absolute tracking in a sub-pixel range. The operations may include an operation to compare two images of a tracking surface. The operations also may include an operation to approximate an intermediate sub-pixel displacement value of a correlation between the two images of the tracking surface, in which the intermediate sub-pixel displacement value is based on a non-linear sub-pixel distribution. The operations also may include an operation to generate a final sub-pixel displacement value from the intermediate sub-pixel displacement value according to a compensation distribution to compensate for the non-linear sub-pixel distribution, in which a combination of the intermediate sub-pixel distribution and the compensation distribution produces a substantially linear distribution. Other embodiments may implement additional operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
   an image sensor comprising a pixel array to generate a plurality of tracking images corresponding to incident light at the pixel array; and
   a tracking engine coupled to the image sensor, the tracking engine configured to determine a sub-pixel displacement value of a tracking surface based on a comparison of at least two of the tracking images, wherein the tracking engine comprises:
      a sub-pixel approximation engine to generate an intermediate sub-pixel displacement value based on a sub-pixel approximation according to a non-linear sub-pixel distribution; and
      a linear approximation engine to generate a final sub-pixel displacement value from the intermediate sub-pixel displacement value;
      wherein the linear approximation engine is further configured to generate the final sub-pixel displacement value according to a compensation distribution to compensate for the non-linear sub-pixel distribution used by the sub-pixel approximation engine; and
      wherein the sub-pixel approximation engine comprises a 3-point peak approximation engine to generate the intermediate sub-pixel displacement value.

2. The optical navigation device of claim 1, wherein the linear approximation engine comprises:
   a rounding approximation engine to round the intermediate sub-pixel displacement value to a rounded sub-pixel displacement value with a specific number of significant digits; and
   a histogram redistribution engine coupled to the rounding approximation engine, the histogram redistribution engine configured to assign the rounded sub-pixel displacement value to one of a plurality of histogram bins, wherein the plurality of histogram bins have bin values that compensate for the non-linear sub-pixel distribution used by the sub-pixel approximation engine.

3. The optical navigation device of claim 2, further comprising a memory device to store compensation data obtained during a configuration stage prior to a tracking operation of the optical navigation device, wherein the rounding approximation engine and the histogram redistribution engine are configured to use the compensation data.

4. The optical navigation device of claim 1, wherein the tracking engine is further configured to perform absolute referencing using the final sub-pixel displacement value.

5. The optical navigation device of claim 4, wherein the tracking engine is further configured to perform the absolute referencing for two-dimensional navigation.

6. The optical navigation device of claim 4, further comprising a second image sensor coupled to the tracking engine, wherein the tracking engine is further configured to receive additional tracking images from the second image sensor and to perform the absolute referencing for multi-dimensional navigation, wherein at least one of the multiple dimensions comprises a rotational dimension.

7. An optical navigation device comprising:
an image sensor comprising a pixel array to generate a plurality of tracking images corresponding to incident light at the pixel array; and
a tracking engine coupled to the image sensor, the tracking engine configured to determine a sub-pixel displacement value of a tracking surface based on a comparison of at least two of the tracking images, wherein the tracking engine comprises:
 a sub-pixel approximation engine to generate an intermediate sub-pixel displacement value based on a sub-pixel approximation according to a non-linear sub-pixel distribution; and
 a linear approximation engine to generate a final sub-pixel displacement value from the intermediate sub-pixel displacement value;
wherein the pixel array comprises a first number of pixels arranged in columns and rows, wherein the tracking engine is further configured to reference a navigation array comprising a second number of pixel values, wherein the second number of pixel values in the navigation array is less than the first number of pixels in the pixel array.

8. The optical navigation device of claim 7, wherein the navigation array is less than about 25% of an area of the pixel array.

9. The optical navigation device of claim 1, wherein the optical navigation device is integrated within a monitor for a printing application, wherein the tracking engine is further configured to accurately track sub-pixel displacement of a print medium during a printing operation.

10. The optical navigation device of claim 1, wherein the optical navigation device is integrated within a monitor for a global positioning system, wherein the tracking engine is further configured to accurately track sub-pixel displacement of an object within a field-of-view of the global positioning system.

11. A method for sub-pixel tracking with an optical navigation device, the method comprising:
 generating a plurality of images of a tracking surface based on light detected at an image sensor; and
 comparing at least two of the images to determine a sub-pixel displacement value of the tracking surface, wherein determining the sub-pixel displacement value of the tracking surface comprises:
  approximating an intermediate sub-pixel displacement value based on a sub-pixel approximation according to a non-linear sub-pixel distribution; and
  generating a final sub-pixel displacement value from the intermediate sub-pixel displacement value according to a compensation distribution to compensate for the non-linear sub-pixel distribution;
  wherein approximating the intermediate sub-pixel approximation comprises generating the intermediate sub-pixel displacement value based on a 3-point peak approximation.

12. The method of claim 11, wherein generating the final sub-pixel displacement value according to the compensation distribution comprises:
 rounding the intermediate sub-pixel displacement value to a rounded sub-pixel displacement value with a specific number of significant digits; and
 assigning the rounded sub-pixel displacement value to one of a plurality of histogram bins, wherein the plurality of histogram bins have bin values that compensate for the non-linear sub-pixel approximation.

13. The method of claim 11, further comprising
 performing absolute referencing using the final sub-pixel displacement value; and
 re-referencing a navigation window to a new base window in response to a determination that the navigation array is within a threshold number of pixels from an edge of a previous base window, wherein the new base window comprises a pixel array having a first number of pixel values, and the navigation window comprises a subset of the first number of pixel values in the new base window.

14. A computer readable storage medium embodying a program of machine-readable instructions, executable by a digital processor, to perform operations to facilitate absolute tracking in a sub-pixel range, the operations comprising:
 compare two images of a tracking surface;
 approximate an intermediate sub-pixel displacement value of a correlation between the two images of the tracking surface, wherein the intermediate sub-pixel displacement value is based on a non-linear sub-pixel distribution; and
 generate a final sub-pixel displacement value from the intermediate sub-pixel displacement value according to a compensation distribution to compensate for the non-linear sub-pixel distribution, wherein a combination of the intermediate sub-pixel distribution and the compensation distribution produces a substantially linear distribution.

15. The computer readable storage medium of claim 14, wherein the operation to approximate the intermediate sub-pixel displacement value comprises an operation to generate the intermediate sub-pixel displacement value based on a 3-point peak approximation.

16. The computer readable storage medium of claim 14, wherein the operations to generate the final sub-pixel displacement value comprise operations to:
 round the intermediate sub-pixel displacement value to a rounded sub-pixel displacement value with a specific number of significant digits; and
 assigning the rounded sub-pixel displacement value to one of a plurality of histogram bins, wherein the plurality of histogram bins have bin values that compensate for the non-linear sub-pixel approximation.

17. The optical navigation device of claim 7, wherein the tracking engine is further configured to re-reference the navigation window to a new base window in response to a determination that the navigation array is within a threshold number of pixels from an edge of the pixel array.

18. An optical navigation device comprising:
an image sensor comprising a pixel array to generate a plurality of tracking images corresponding to incident light at the pixel array; and
a tracking engine coupled to the image sensor, the tracking engine configured to determine a sub-pixel displacement value of a tracking surface based on a comparison of at least two of the tracking images, wherein the tracking engine comprises:
 a sub-pixel approximation engine to generate an intermediate sub-pixel displacement value based on a sub-pixel approximation according to a non-linear sub-pixel distribution; and
 a linear approximation engine to generate a final sub-pixel displacement value from the intermediate sub-pixel displacement value;
 wherein the optical navigation device is integrated within a monitor for a printing application, wherein the tracking engine is further configured to accurately track sub-pixel displacement of a print medium during a printing operation.

19. An optical navigation device comprising:
an image sensor comprising a pixel array to generate a plurality of tracking images corresponding to incident light at the pixel array; and
a tracking engine coupled to the image sensor, the tracking engine configured to determine a sub-pixel displacement value of a tracking surface based on a comparison of at least two of the tracking images, wherein the tracking engine comprises:
  a sub-pixel approximation engine to generate an intermediate sub-pixel displacement value based on a sub-pixel approximation according to a non-linear sub-pixel distribution; and
  a linear approximation engine to generate a final sub-pixel displacement value from the intermediate sub-pixel displacement value;
wherein the optical navigation device is integrated within a monitor for a global positioning system, wherein the tracking engine is further configured to accurately track sub-pixel displacement of an object within a field-of-view of the global positioning system.

20. A method for sub-pixel tracking with an optical navigation device, the method comprising:
generating a plurality of images of a tracking surface based on light detected at an image sensor; and
comparing at least two of the images to determine a sub-pixel displacement value of the tracking surface, wherein determining the sub-pixel displacement value of the tracking surface comprises:
  approximating an intermediate sub-pixel displacement value based on a sub-pixel approximation according to a non-linear sub-pixel distribution; and
  generating a final sub-pixel displacement value from the intermediate sub-pixel displacement value according to a compensation distribution to compensate for the non-linear sub-pixel distribution;
  wherein generating the final sub-pixel displacement value according to the compensation distribution comprises:
  rounding the intermediate sub-pixel displacement value to a rounded sub-pixel displacement value with a specific number of significant digits; and
  assigning the rounded sub-pixel displacement value to one of a plurality of histogram bins, wherein the plurality of histogram bins have bin values that compensate for the non-linear sub-pixel approximation.

* * * * *